(12) United States Patent
Shivakumar

(10) Patent No.: US 10,108,601 B2
(45) Date of Patent: Oct. 23, 2018

(54) METHOD AND SYSTEM FOR PRESENTING PERSONALIZED CONTENT

(71) Applicant: Infosys Limited, Bangalore (IN)

(72) Inventor: Shailesh Kumar Shivakumar, Bangalore (IN)

(73) Assignee: Infosys Limited, Bangalore (IN)

( * ) Notice: Subject to any disclaimer, the term of this patent is extended or adjusted under 35 U.S.C. 154(b) by 1072 days.

(21) Appl. No.: 14/489,410

(22) Filed: Sep. 17, 2014

(65) Prior Publication Data

US 2015/0081611 A1    Mar. 19, 2015

(30) Foreign Application Priority Data

Sep. 19, 2013 (IN) .......................... 4213/CHE/2013

(51) Int. Cl.
*G06F 17/30* (2006.01)
*G06F 17/27* (2006.01)
*G06F 17/21* (2006.01)

(52) U.S. Cl.
CPC ........ *G06F 17/2745* (2013.01); *G06F 17/211* (2013.01); *G06F 17/30867* (2013.01)

(58) Field of Classification Search
None
See application file for complete search history.

(56) References Cited

U.S. PATENT DOCUMENTS

| 7,689,682 B1* | 3/2010 | Eldering | G06Q 40/00 709/218 |
| 8,156,113 B2* | 4/2012 | Aravamudan | G06F 17/30035 707/723 |
| 8,602,793 B1* | 12/2013 | Sniedzins | G09B 5/00 434/322 |
| 8,930,204 B1* | 1/2015 | Igoe | G06F 17/30699 705/2 |
| 8,942,973 B2* | 1/2015 | Viswanathan | G06F 17/277 704/277 |

(Continued)

OTHER PUBLICATIONS

Xu et al., "Context-Aware Content Filtering & Presentation for Pervasive & Mobile Information Systems," AMBI-sys 2008, Feb. 11-14, 2008, Quebec, Canada, 8 pages.

*Primary Examiner* — Paulinho E Smith
(74) *Attorney, Agent, or Firm* — Klarquist Sparkman, LLP

(57) ABSTRACT

Content personalized for a user is presented. Particularly, content is personalized and presented to a user in a more cognitive and user-understandable manner to improve the impact and the effectiveness on the user. The system utilizes artificial intelligence to analyze and categorize the content and thereby learns to discover the core concept of the content and any patterns involved. The system also understands the user's interests by capturing the preferred presentation formats and the user's past knowledge. The system maps the categorized content and user's interests and personalizes the content and renders into user preferred presentation type and format. The system supplements the main presentation type with additional related content. The system is capable of continuously monitoring the user activities to understand the effectiveness of the presented content type and formats, and feedback is exploited to continuous improvement of presented content and presentation type and formats.

36 Claims, 8 Drawing Sheets

(56) References Cited

U.S. PATENT DOCUMENTS

| | | | |
|---|---|---|---|
| 9,135,245 B1* | 9/2015 | Nijim | G06F 17/289 |
| 9,141,624 B2* | 9/2015 | Bhogal | G06F 17/30569 |
| 9,235,844 B2* | 1/2016 | Paul | G06Q 30/02 |
| 2003/0061611 A1* | 3/2003 | Pendakur | H04N 7/17318 725/46 |
| 2003/0217328 A1* | 11/2003 | Agassi | G06F 17/30699 715/202 |
| 2003/0237093 A1* | 12/2003 | Marsh | G06F 3/0481 725/46 |
| 2004/0003097 A1* | 1/2004 | Willis | G06F 17/30867 709/228 |
| 2005/0022239 A1* | 1/2005 | Meuleman | G06F 17/30035 725/46 |
| 2007/0061712 A1* | 3/2007 | Bodin | G06F 17/30569 715/234 |
| 2008/0092182 A1* | 4/2008 | Conant | H04N 7/17318 725/109 |
| 2008/0109285 A1* | 5/2008 | Reuther | G06F 17/30864 705/7.11 |
| 2008/0172274 A1* | 7/2008 | Hurowitz | H04W 4/02 455/433 |
| 2008/0189099 A1* | 8/2008 | Friedman | G06F 17/30766 704/8 |
| 2009/0083129 A1* | 3/2009 | Pradeep | G06Q 30/02 705/7.29 |
| 2009/0150400 A1* | 6/2009 | Abu-Hakima | G06F 17/30864 |
| 2009/0187593 A1 | 7/2009 | Chen et al. | |
| 2011/0113041 A1* | 5/2011 | Hawthorne | G06F 17/30905 707/749 |
| 2011/0258049 A1* | 10/2011 | Ramer | G06F 17/30867 705/14.66 |
| 2012/0123992 A1* | 5/2012 | Randall | G06F 17/30038 706/50 |
| 2013/0290233 A1* | 10/2013 | Ferren | G06K 9/3266 706/46 |
| 2014/0100844 A1* | 4/2014 | Stieglitz | G06F 17/289 704/3 |
| 2014/0122595 A1* | 5/2014 | Murdoch | C03C 21/002 709/204 |
| 2014/0164507 A1* | 6/2014 | Tesch | H04L 51/10 709/204 |
| 2014/0180760 A1* | 6/2014 | Karatzoglou | G06Q 30/0269 705/7.29 |
| 2015/0070585 A1* | 3/2015 | Sharif-Ahmadi | G08C 17/02 348/564 |
| 2015/0081611 A1* | 3/2015 | Shivakumar | G06F 17/211 706/46 |
| 2016/0132608 A1* | 5/2016 | Rathod | G06F 17/30867 707/722 |
| 2016/0171559 A1* | 6/2016 | Conant | H04N 7/17318 705/14.66 |
| 2016/0182658 A1* | 6/2016 | Allinson | H04L 67/1097 709/224 |
| 2016/0196490 A1* | 7/2016 | Chandrasekaran | G06F 17/30554 706/50 |
| 2016/0277244 A1* | 9/2016 | Reichert, Jr. | H04L 41/0823 |
| 2017/0091886 A1* | 3/2017 | Ackley | G06Q 50/18 |
| 2017/0279867 A1* | 9/2017 | Morton | H04W 4/206 |
| 2017/0323348 A1* | 11/2017 | Kenyon | G06Q 30/0271 |

* cited by examiner

METHOD AND SYSTEM FOR PRESENTING PERSONALIZED CONTENT

BACKGROUND

Technical Field

The field generally relates to presentation of the network contents and more specifically, to a method and system for presenting the content personalized to the users in more cognitive and effective way to improve the understandability of the presented content and the impact and effectiveness of the presented content to enable the ease of knowledge acquisition for the user.

Description of Related Art

The fundamental intention of any content is to make the user understand the core subject matter discussed in that content. The Conventional content delivery systems available in the art merely present the content to a user from the pre-categorized content types and based on the user's feedback on the content type but without any changes in the presentation type or format. Often users find understanding this content more time consuming, difficult to understand. After taking good amount of time to go through the content, and grasping the intent of the content, users may feel the content not so relevant, ineffective and insignificant.

Especially when the content is in textual format it is more difficult to the user to quickly grasp the contents of the content presented. Many studies have concluded the fact that visual representation of a concept will have more impact on the user and would be easier for the user to get the intent of content presented in much lesser time with more precision. Similarly, when the subject matter is data intensive or contains inherent complex relationships between entities, it would be challenging to intuitively represent it in a textual mode. It would be difficult for the users to discover trends, patterns and establish relationships in this medium. Using more intuitive data visuals like infographics or graphs or content map or a combination of text and graphics would help the user to better make sense of it. Also, to have more insights and draw conclusions out of the content presented, user needs to go through other related content on the concept of interest by finding them manually and then temporarily memorize the inputs gained from the content presented before.

Conventional content delivery systems present the content data without any changes in the presenting style or format and fail to create the impact of content presented on users. Also, these systems don't focus on capturing user's attention and motivation levels. This would in-turn affect the retention and recollection of the concept. As a result, users would not be able to obtain the knowledge contained and intended in the content presented. Also most often the content delivery systems present the content type statically for all users without considering their friendlier presentation types and their past knowledge about the subject matter.

SUMMARY

One of the embodiments of present invention relates to a method for presenting the content personalized for the user. The method includes analyzing and categorizing the content using artificial intelligence techniques to discover the core concept of content and any patterns involved. The method also includes determining the user's interests, prior knowledge by capturing the user data, preferred content types, presentation type and formats. The information on user's interests, prior knowledge is stored on a memory. The method further includes mapping the categorized content to user's interests and prior knowledge to discover the relevant content, from the categorized content, and preferred presentation type and formats. The relevant content discovered is transformed into a preferred presentation type and formats and presented to user in one or more user preferred languages.

In another embodiment, user's activities during the presentation are monitored and user's feedback on the effectiveness of the presented content type and presentation type and formats is collected to update the user's interests on the memory. Based on the updated user's interests the most relevant content with a most preferred presentation type and formats is presented.

One of the embodiments of invention further includes gathering the content related to the core concept of content, presented to the user, from plurality of web sources. The gathered content related to the core concept of content presented to the user is also presented in real time during content presentation.

Another of the embodiments of present invention relates to a system for presenting the content personalized for the user. The system includes a learning module for analyzing and categorizing the content using artificial intelligence to discover the core concept of the content and any patterns involved. The system further includes a training module for understanding the user's interests, prior knowledge by capturing the preferred content type, presentation type and formats, user data and storing on a memory. A content processing module maps the categorized content to user's interests and prior knowledge to discover the relevant content and preferred presentation type and formats. A content processing module also processes the relevant content into a preferred presentation type and formats for presenting to user in one or more user preferred languages. The system further includes an analytics module for monitoring user's activities during the presentation, collecting user's feedback on the effectiveness of the presented content type and presentation type and formats and updating the user's interests on the memory. A presentation module presents the most relevant content with a most preferred presentation type and formats based on the updated user's interests.

Another embodiment of present invention further includes a searching module for gathering the content related to core concept of content, presented to the user, from plurality of web sources for further presenting the content related to the core concept of content presented to the user during the content presentation in real time.

The above presented is the summary of some aspects of the invention and is not an extensive overview of the invention. The summary merely tries to exemplify some of the concepts of the invention in a simplified form. It does not limit the scope or key elements of the invention in any way.

BRIEF DESCRIPTION OF THE DRAWINGS

These and other features, aspects, and advantages of the present invention will be better understood when the following detailed description is read with reference to the accompanying drawings in which like characters represent like parts throughout the drawings, wherein.

DETAILED DESCRIPTION

The following description is the full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to get an advantage without the corresponding use of other features described in the following paragraphs. As such, the present description should be considered as merely illustrative of the principles of the present technique and not in limitation thereof, since the present technique is defined solely by the claims.

Figure 1:
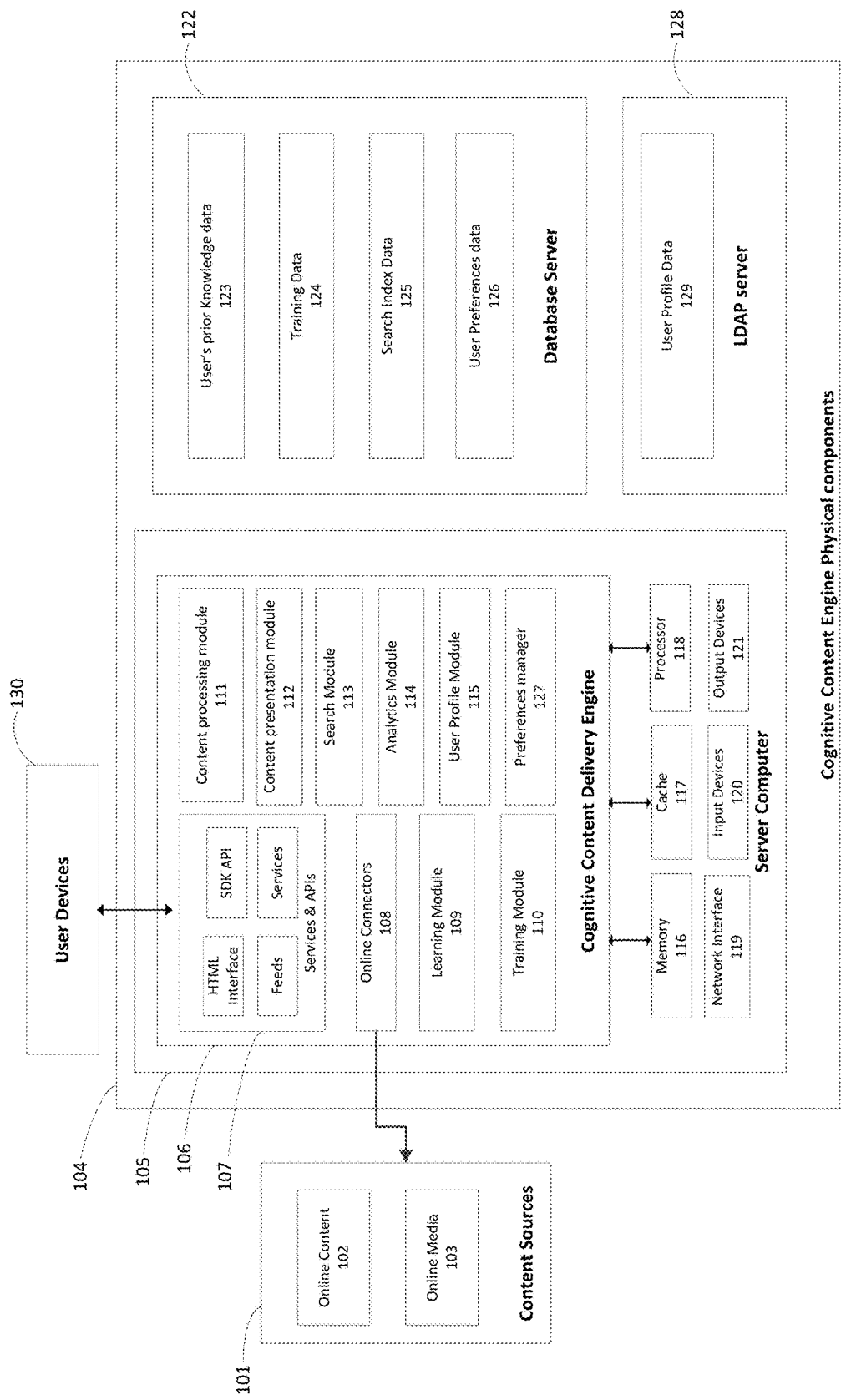
FIG. 1 illustrates an example of implementation architecture for delivering the personalized content to a user according to an embodiment of the invention.

FIG. 1 shows example architecture for implementing the present invention where the user requested content is received from content sources 101. User requested content such as online contents 102, online media files 103 is received by the content delivery engine 106 at the server computer 105 through online connectors 108. The server computer 105 operates in a networked environment which is connected to network via network interface. Services and application programming interfaces (APIs) module 107 of content delivery engine 106 provides the services of cognitive content delivery engine 106. Hypertext Markup Language (HTML) Renderer Service renders user friendlier presentation type as HTML response. Feeds component provides the functionalities in Really Simple Syndication (RSS) feed format. Software Development Kit (SDK) framework provides API for the cognitive content delivery engine 106. Content received at content delivery engine 106 is analyzed and categorized by the learning module 109. Further APIs are provided for the functionalities of the present system including learning module 109, content processing module 111 and content presentation module 112. The input devices 120 and output devices 121 form the user interfacing components. The server computer 105 hosting the cognitive content delivery engine 106 is responsible for serving the response to the user requests. The cognitive content delivery engine 106 can also be hosted in cloud to provide this Software-as-Service (SaaS).

User profile manager 115 and Preferences manager 127 determine if any of the user's prior knowledge data 123, training data 124, and user preferences data 126 is available with the memory 116 or database server 122. User's prior knowledge data 123, Training data 124, Search index data 125 and User preference data 126 collectively form the knowledge repository. Learning module 109 takes into account also any or all of the user's prior knowledge 123, training data 124, and user preferences data 126 stored at database server 122 or memory 116 with the help of predictive application programming interfaces (APIs) for content categorization. Where the user's prior knowledge data 123 is not found, user's knowledge data on the content being processed, among several other aspects associated with user are captured by the training module 110 and stored at the database server 151. Where the training data 124 is not found, data, related to user, such as user's education, subject matter expertise, topics of interests, working field, content reading history among many other similar aspects related to user are captured by the training module 110 and stored at the database server 151. Where the user preferences data 126 is not found, user's preferences on the content being delivered and the content presentation type and format are captured by the training module 110 and stored at the database server 151.

When a user is logging in for the first time, Cognitive Content delivery engine 106 requires the authentication of the user against the user repository. A dedicated Lightweight Directory Access Protocol (LDAP) server 128 is used for storing user profile data 129. The user profile data 129 includes the specific user's profile attributes such as user name, phone number and other contact details of user. This user profile data 129 is used by preferences manager for obtaining explicit preferences of user.

Content processing module 111 receives the content categorized by learning module 109 to perform the mapping step wherein the categorized content is compared and contrasted to the user's prior knowledge data 123, training data 124, and user preferences data 126. The content personalized based on the mapping of content is further transformed by the content processing module 111 to customize the presentation type and format of content being delivered to the user based on the user preferences data 126. Personalized and transformed content is further rendered and presented to the user on the user device 130 by the content presentation module 112. If the user preferences data 126 is not found as in the case of a public user or a guest user scenario, the cognitive content delivery engine 106 identifies the most appropriate presentation type suitable for the concept.

Various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a personal trusted device, a web appliance, or any other machine capable of executing a set of instructions (sequential or otherwise) that specify actions to be taken by that machine can be used as a user device to implement the present system.

Search module 113 provides online information, relevant to the content being presented to the user, through hyperlinks, videos, articles related to the content subject matter to help user understand the concept better. Search module 113 also provides online information belonging to the same category of the content subject matter to further help the user explore further on the concept of content being presented to the user. Search module also uses social connectors to connect to various social media platforms for providing information, relevant to the content being presented to the user, from popular social media websites. Search module 113 further explores the knowledge resources, on the world-wide web, that include Wikipedia, dbpedia, freebase, Yago, wordnet, quora, yahoo answers, encyclopedia of life, encyclopedia of science, medpedia, howthestuffworks and similar sources. A third party search engine interface may also be included using pluggable extensions to interface with external search engines like Google, Bing to obtain information relevant to the contents being presented to the user.

Analytics module 114 is provided for actively tracking the user's behavioral activities during the content presentation to understand user's behavior. Activity tracking happens both implicitly and explicitly. The implicit tracking of user's activity monitored comprises at least one among the click events, download events, usability analysis, reading time and scroll data. This helps to find the effectiveness on the user, rendered presentation format, rendered layout of the content being presented to user. Analytics module 114 further updates the user's interests on the memory 119.

Figure 2:
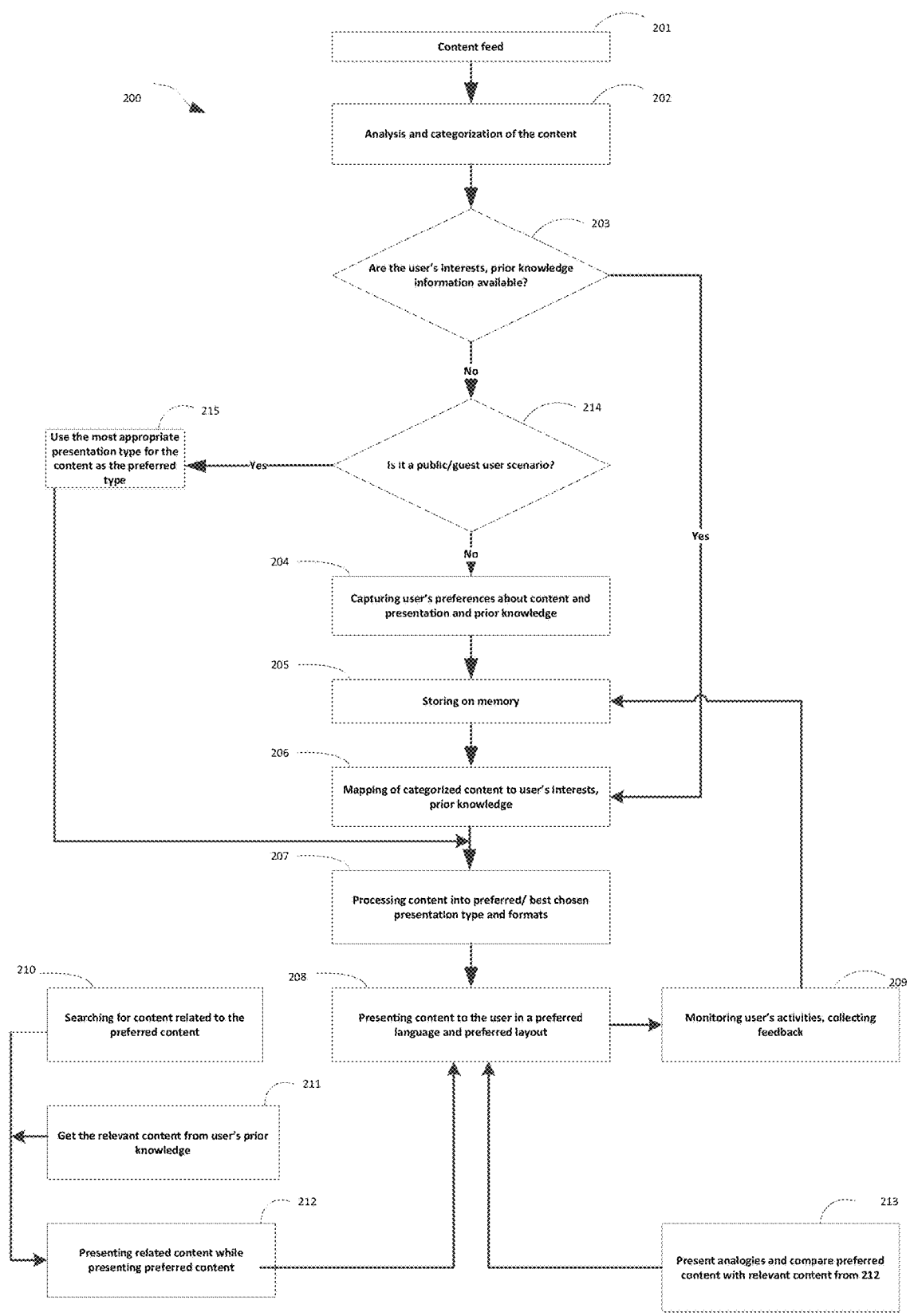
FIG. 2 is a flow diagram illustrating a method of delivering the personalized content to a user, according to an embodiment of the invention.

As illustrated in FIG. 2, a method for presenting the personalized content to a user according to an embodiment of the present invention is designated as 200. On the request from the user contents received are fed in the step 201 to the learning module 109. Content fed to the learning module 109 is analyzed and categorized in step 202 by using Natural Language Processing (NLP) techniques. The NLP techniques include at least one of the semantic analysis, spatial analysis, chronological analysis, conceptual analysis, quantitative analysis, pattern analysis, and theme analysis techniques.

Further, method includes determination step 203 to find the presence of user's prior knowledge data, and user's preferences, about the content type and the presentation type and format, with the system according to the present invention. In the event of non-availability of user's prior knowledge data, system initiates to capture the user's prior knowledge levels. Similarly in the event of non-availability of user's preferences, system initiates to capture the user's preferences about the content type and presentation type and format. In case of a public user or a guest user scenario as in step 215, the system uses the most appropriate presentation type as the preferred type. In step 205, the data captured by the system on the user's knowledge levels and user's preferences about the content and presentation types and format is stored on the memory for further usage. Data captured by the system on user's preferences is also shared to the preferences manager for leveraging this data during the content personalization and transformation.

Content analyzed and categorized in step 202 is further mapped to the user's knowledge levels and user's preferences about the content type and presentation type and format, in step 206, to personalize the content requested by the user. In step 207, the personalized content is transformed into user preferred presentation type and format and preferred language to make it ready for delivering to the user. In case of public user scenario, content is transformed into best chosen presentation type and format. The content so transformed based on the user's preferences is further presented to the user at the user device 130 in step 208.

According to one embodiment of the invention, the method also includes a step 209 for monitoring the user's behavior during the personalized content presentation. The user's activities monitored during presentation comprise the click events, download events, usability analysis, reading time, and scroll data among many other behavioral aspects of user. The data on user's activities during content presentation is captured and stored on the memory and shared to preferences manager for further usage. Based on the data captured in step 209, the content being presented to user is further personalized and the most preferred content type is presented to the user in a most preferred presentation type and format to improve the effectiveness of content on the user.

According to another embodiment of the invention, in step 210, the method also includes searching for the content relevant to the content personalized and presented to the user in steps 201 to 208, through various online search techniques and online sources of information using appropriate connectors. In another embodiment, step 211 includes search for the content based on the user's prior knowledge, preferences regarding the content of interest to the user, previously learnt by the system. In step 212, the relevant content resulted from the search in step 210 or 211 or both are further presented to the user along with the personalized content being presented to the user. The relevant content can include online links, audio, video information, any further information or sources of content of interest to user.

According to another embodiment of the invention, in step 213, the method also can present the user with several analogies for improved content understandability and further enhancement of knowledge levels of the user. Content with concept similar or belonging to the same category of the personalized content being presented is identified by using the core idea and the category of subject matter of personalized content being presented. The analogies are drawn from user's acquired knowledge or easy-to-understand real world samples. Also, comparison and contrasting of the core concept with any available concept in the knowledge store is presented to the user along with and during the personalized content presentation.

Figure 3:
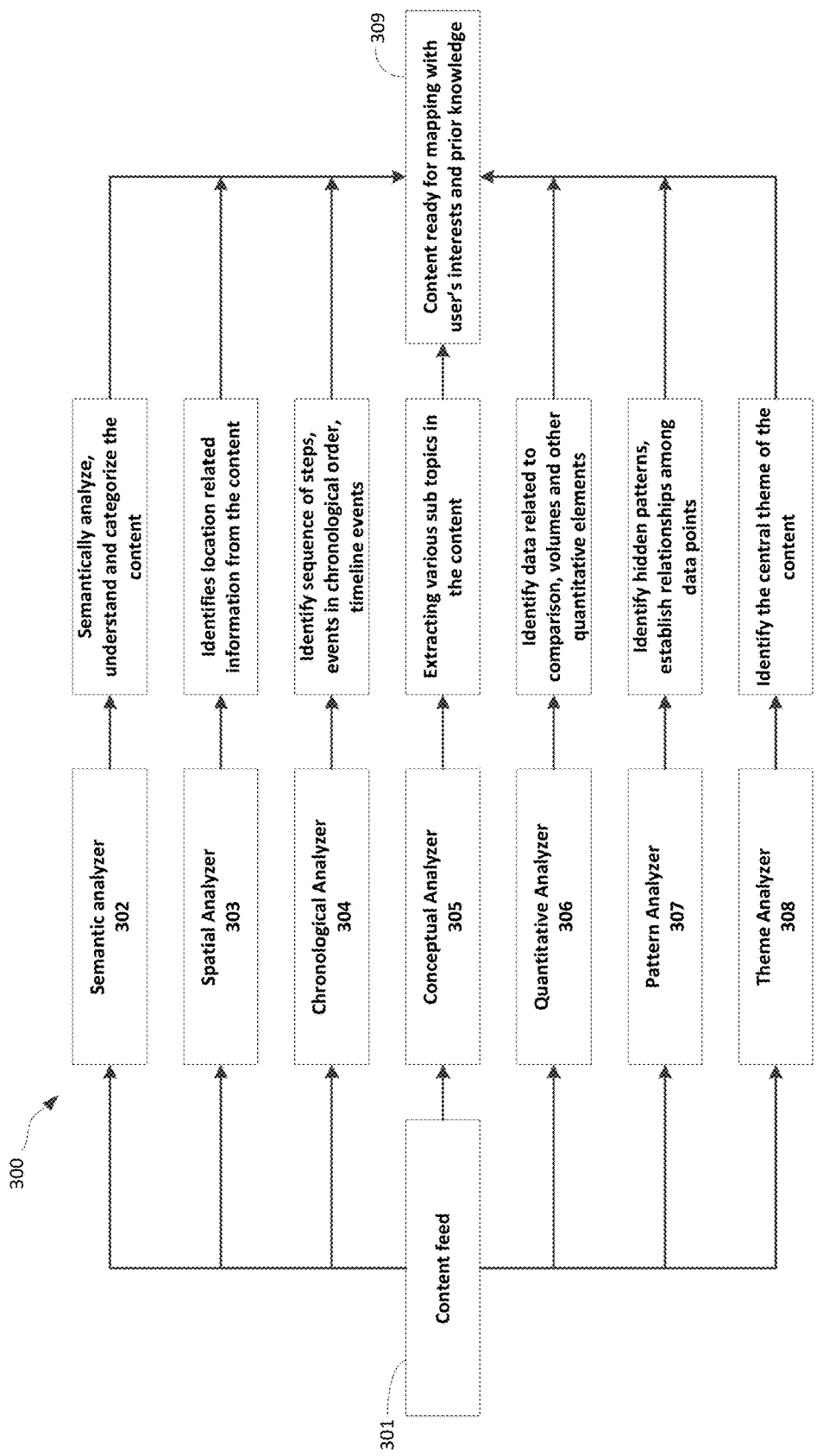
FIG. 3 illustrates a learning module of the system for delivering the personalized content to a user, according to an embodiment of the invention.

Functional modules according to the various embodiments of the present invention are now described in detail. FIG. 3 presents the learning module 300 according to an embodiment of the present invention. Content requested by the user is analyzed and categorized by learning module 300 of the present invention by using the artificial intelligence based techniques. Learning module 300 receives the content feed 301 and employs various NLP techniques to analyze and categorize the content. Semantic analyzer 302 is a component of NLP which processes the words in a given context to extract the "meaning or core concept" of the content feed. Based on the concepts extracted, the content feed 301 is categorized into various concept based categories and concept based categorized content is made available for further mapping process. Spatial analyzer 303 is provided to identify the location related information in the subject matter of content feed 301. Location related information can include, among many others similar aspects, distance, directions between the locations, maps, geographical identification, and numeral information of location, comparative information, current and past incidents with respect to the locations. Spatial analyzer 303 further analyzes the location information from content feed 301 and helps to render the content into graphical representations, geographical maps, route maps and other appropriate types of representation.

Chronological Analyzer 304 is provided to identify the sequence of steps, events happening in chronological order, timeline events from the content feed 301. The events/steps are extracted from the content feed 301 and provided in a well-defined structure which can be extracted by the presentation renderer during content presentation. Further, conceptual Analyzer 305 extracts all key concepts and sub-concepts from the subject matter of content feed 301. Conceptual analyzer 305 recognizes the relationship between entities and helps in content categorization. Quantitative analyzer 306 is provided to analyze the data intensive subject matter from the content feed 301. Data intensive information can include numerical data, comparative data, data patterns over a period of time and other similar quantity related information.

Pattern analyzer 307 is another component of NLP which analyzes the patterns, trends, arrays, series and other similar aspects from the content feed 301. Also, pattern analyzer 307, along with semantic analyzer 302, categorizes the content feed 301 and also able to apply the various statistical models to the data to make possible projections, provide probabilities, predictions as relevant. Theme analyzer 308 is another component of NLP that identifies the central theme of the subject matter from the content feed 301.

Figure 4:
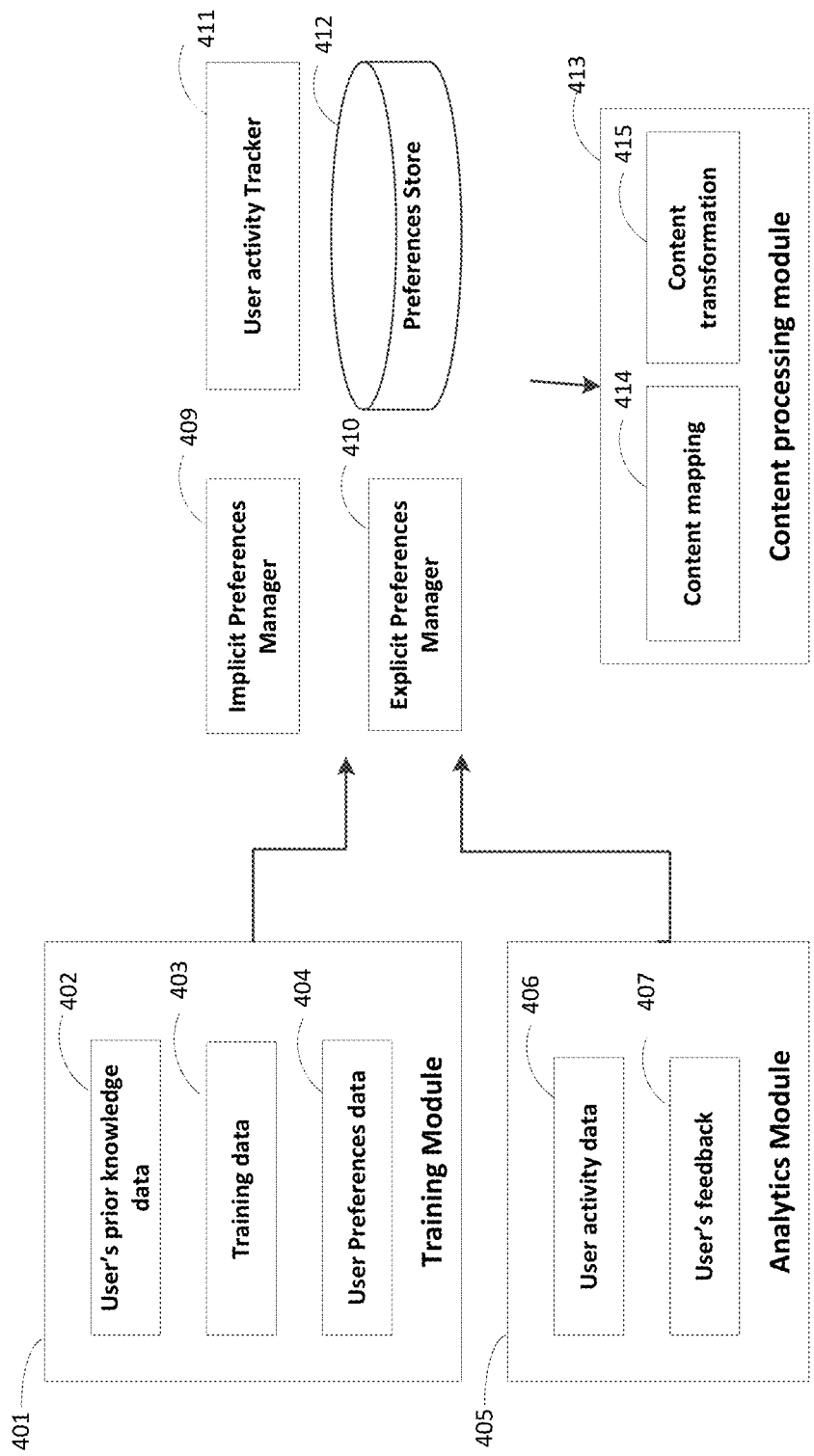
FIG. 4 illustrates the architecture of the system for delivering the personalized content to a user, according to an embodiment of the invention.

As illustrated in FIG. 4, according to an embodiment, the training module 401 is provided to capture the user's prior knowledge data 402, training data 403, and user preferences data 404. User's knowledge data 402 that includes user's knowledge levels regarding the content requested by the user among other aspects associated with the user is captured by the training module 110 and transmitted to the preferences manager 408. Training data 403, related to user, such as user's education, working field, areas of interest, content reading history among many other similar aspects related to user is captured by the training module 110 and transmitted to the preferences manager 408. User preferences data 404, including user's preferences on the content to be delivered and the content presentation type and format is captured by the training module 110 and transmitted to the preferences manager 408 for further usage at steps of mapping, processing and transforming the content.

Analytics module 405 is provided to monitor the user's activities and generate the user activity data 406 and to collect the user's feedback 407 during the presentation of personalized content according to the present invention. Analytics module 405 closely monitors user's behavior and actively tracks the user's activities during the personalized content presentation to generate the user activity data 406 thereby to understand user's behavior and preferences about the personalized content presented to the user. The user's activities monitored comprise at least one among the click events, download events, usability analysis, reading time and scroll data. Analytics module 405 further transmits captured user activity data 406 to the preferences manager 408 for further usage by the system. In addition to user activity data, analytics module 405 collects user's feedback 407 explicitly during content presentation by providing the user a set of queries, options to choose from on the content type an presentation type and format, and other feedback mechanisms. User's feedback 407 collected by the analytics module 405 is transmitted to the preferences manager 408 for further usage by the system. Both the implicit and explicit preferences help system to find the effectiveness on the user, rendered presentation format, rendered layout of the content being presented to user.

Preferences manager 408 is provided for storing and managing the various preferences and activities of the user received from the training module 401 and the analytics module 405. Preferences manager 408 consists of implicit preferences manager 409 for managing user's implicit or non-voluntary preferences. Implicit preferences manger 409 uses training module 401 and analytics module 405 to derive the implicit preferences of the user. User's implicit preferences include but not limited to user's geography, limited knowledge of user's location learned from the browser used by user, preferences about media type. Preferences manager 408 also consists of explicit preferences manager 410 for managing user's explicit or voluntary preferences about the content and presentation type and format. Explicit preferences include but not limited to preferences about the content type, media type, presentation type and format, language, user's interests, content rating. Explicit preferences manger 410 uses training module 401 and analytics module 405 to derive the implicit preferences of the user. User profile data 129 stored on LDAP server 128 containing the specific user profile attributes such as user name, phone number and other contact details is used by preferences manager for obtaining explicit preferences.

Another component of preferences manager 408 user activity tracker 411 is provided to manage the user's activities data 406 obtained by the analytics module 405 during the presentation of personalized content to the user. When there is conflict between similar-category of preferences between implicit and explicit categories, precedence is always given to explicit preference. For instance if the implicit preference manager 409 finds the user language as "Spanish" based on browser locale, but if user has specified "English" as preferred language explicitly, preferences manager 408 chooses "English" for content rendition. Preferences manager 408 further consists of a preferences store 412, a database that preserves user's implicit and explicit preferences and the tracked user's activities to further supplement the mapping, and transforming of content.

Content processing module 413 personalizes the content 309 received from learning module 300 in the content mapping step 414 and content transformation step 415 based on the analyzed and categorized content 309 received from the preferences manager 408 and learning module 300. Analyzed and categorized content 309 is subjected to the mapping based on the user's prior knowledge data 402, training data 403, obtained from training module 401 and the data available with preferences manager 408. A rules engine provided with the content processing module 413 allows flexible configuration of rules to personalize the visuals based on user's preferences. Rules engine obtains the user's preferences data available with preferences manager 408. The system also enables the user to configure the rules using rules engine.

Figure 5:
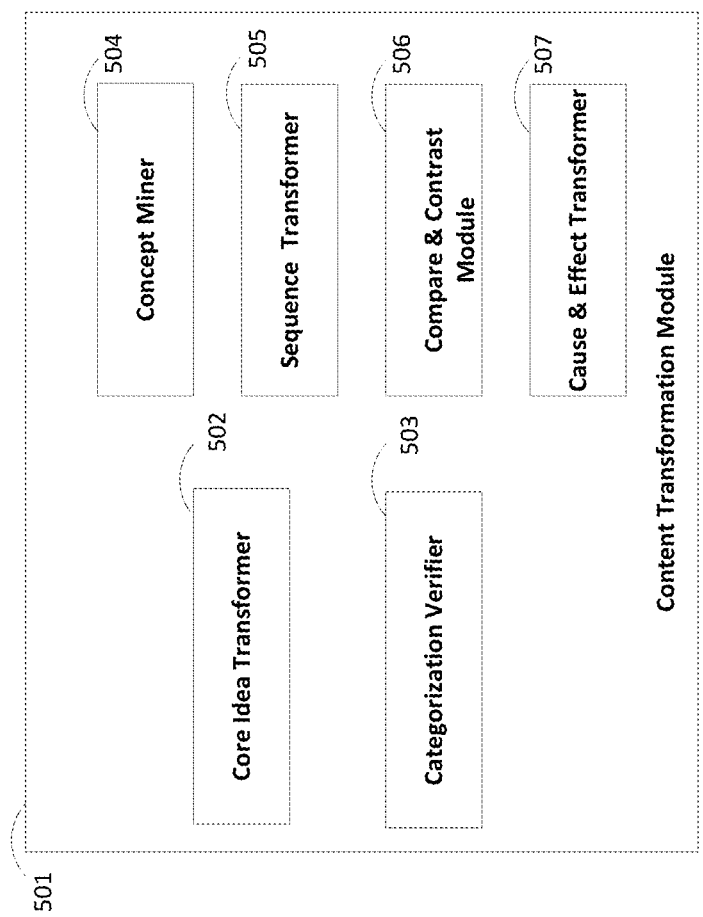
FIG. 5 illustrates a content transformation module of the system for delivering the personalized content to a user, according to an embodiment of the invention.

Further, the content obtained from content mapping step 414 is transformed in the step 415 to generate the personalized content. According to FIG. 5 content transformation module 501 is provided to transform the as-is content to the user's preferred friendlier presentation format considering various factors. The module is a part of content processing component which gets it input from learning module. The structured information obtained from the learning module 300 is further refined and transformed into preferred presentation type and format. In one of the embodiments of the present invention, the core idea transformer 502 uses the structured information obtained from the theme analyzer 308 and uses the bulleted summary format to fill the information.

Categorization verifier 503 re-verifies the content categorization done by learning module 300. The information of categories is further used for rendering the analogies and compare & contrast information. Concept miner 504 parses the entire content and identifies all the sub-concepts and other concepts in the content. Concept miner 504 also extracts the content that support and complement the core concept of the content being presented to the user. Sequence transformer 505 uses the input from chronological analyzer 304 and transforms into the InfoGraphics format. Compare & contrast module 506 uses the structured data obtained from theme analyzer 308 and concept miner 504 to identify all core concepts and sub concepts of the content and extracts the content with similar or matching category from knowledge repository. Compare & contrast module 506 further uses the information on category, core concept and sub-concepts of the content while rendering the analogies during the content presentation. The content obtained from the chronological analyzer 304, cause and effect transformer 507 is transformed into the InfoGraphics format.

Figure 6:
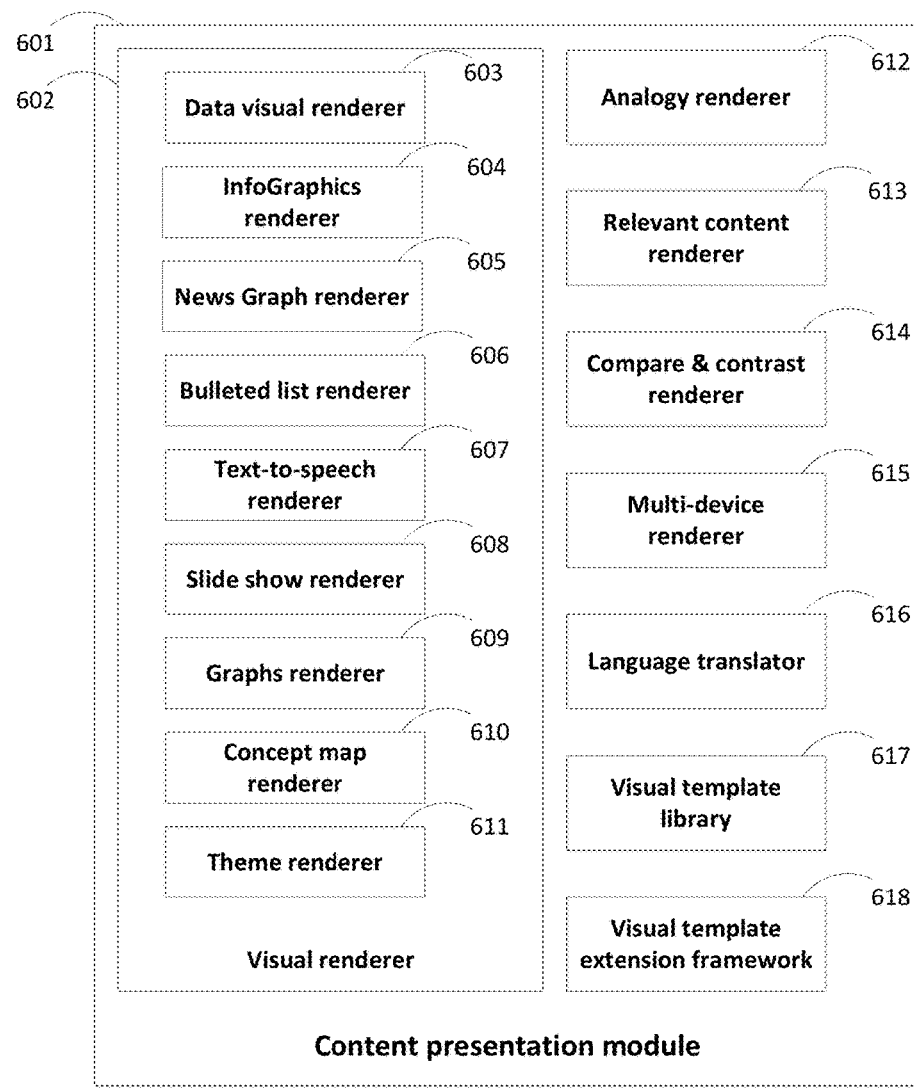
FIG. 6 illustrates a content presentation module of the system for delivering the personalized content to a user, according to an embodiment of the invention.

As illustrated in FIG. 6, Content presentation module 601 uses visual renderer 602 for rendering the personalized content received from the content processing module 413. Visual renderer 602 can present the structured data of personalized content into various presentation types. The present invention supports various visual renderers such as Data visual renderer 603, InfoGraphics renderer 604, News graph renderer 605, Bulleted list renderer 606, Text-to-speech renderer 607, Slideshow renderer 608, Graphs renderer 609, Concept Map renderer 610, Theme renderer 611 among many other renderers.

Data visualization renderer 603 can be used to render the content into highly effective visuals and to facilitate the user to quickly interpret the data being presented. InfoGraphics Renderer 604 is used to create the InfoGraphics (Graphics and Text) to represent the main concept and supporting data of the content which works on "show, don't tell" concept. InfoGraphics Renderer 604 is also used to visualize data intensive content such as census data, voting data, distribution data and other relevant data types. News Graph renderer 605 is used to create a news graph from the content. News Graph renderer 605 is mainly used to visualize the enormous amount of news content to visualize the news content and to discover emerging trends. News Graph renderer 605 includes features such as extracting the news highlights based on popularity, grouping of news based on languages, geographies, topics.

Bulleted list renderer 606 lists the key points of the content to represent the concept with a list of supporting arguments such as feature list of a product, problems and solutions and other similar concepts. Text-to-speech renderer 607 converts the text to speech and reads through the displayed bulleted list of the content. Listening to the key points of content presented is more helpful to users who prefer the audio version of the content. Slideshow renderer 608 renders the key points of content in a slide show format containing the key highlights with graphics. Graphs renderer 609 presents the content data in a graphical format. Especially, when comparing the data intensive content, data presented in a graphical format is more effective on the user. Data intensive content such as financial data, budgetary data, and research data can be more effectively represented using InfoGraphics renderer 604 in combination with Graph renderer 609 that further enables the user to discover any subtle patterns in such data intensive content and to visualize the percentage in opinion, predictions, and polls in quantitative data. Concept map renderer 610 is used for depicting the complex subject matter in the content with inter-related concepts in concept map presentation type. Concept map presentation types are usually used for depicting hierarchy of entities along with their relationships, representing complex ideas and concepts. Theme renderer 611 presents the core idea of the subject matter in the user's preferred location on the content presentation layout. Theme renderer 611 also is capable of rendering the summary or any noticed pattern along with core idea and presenting at the central location of presentation layout to draw the attention of user.

Analogy renderer 612 uses the core idea of the subject matter and the category of the subject matter in the content to identify a similar concept or concept belonging to the same category from the knowledge repository. Based on the analysis of learning module 300 on the content requested by the user, analogy renderer 612 retrieves the matching concepts and categories. Analogies form the core of cognition wherein new concepts and knowledge is learnt based on the similarities to the already acquired core concepts. User is also optionally enabled to classify the new concepts according to the similarities to the existing concepts by prototypical concept. Relevant content renderer 613 aggregates the links to content sources, articles, graphics, videos and other assets relevant to the subject matter of the personalized content presented to the user from online sources. For this purpose relevant content renderer 613 uses the in-built search engine to display the relevant online content along with the personalized content presented to the user.

Compare and contrast renderer 614 is an optional renderer provided by the present system. Compare and contrast renderer 614 uses the content categorized by the learning module 300 and finds the content with a similar concept in the knowledge repository. Compare and contrast renderer 614 compares the features of and identifies similarities and differences between the concept of content categorized by the learning module 300 and the concept of content found from the knowledge repository and presents to the user along with the personalized content being presented to the user. Further the user is enabled to compare the core concept of personalized content with any concept of content available with knowledge repository. Multi-device renderer 615 helps in rendering the presentation on variety of user devices. Multi-device renderer 615 also helps in adjusting the page layout, reducing the graphics, choosing device friendly presentation types to effectively represent the concept on a given device.

The foregoing renderers can be used in the present invention on standalone basis or in combination of other renderers to achieve various presentation types and formats and their combinations. The content types foregoing renderers can be used on should not be limited only to specified types of content and the renderers can be used on any type of the content as they are capable of rendering. In addition to the renderers, the presentation module 601 also provides a language translator 616 to translate the personalized content into user's preferred language obtained from preferences manager 408. The language translator 616 is also capable of rendering the content in a user preferred language on multiple user devices. User can specify the preferred language as a part of user's preferences.

A visual template library 617 is included in the content presentation module 601 to store the collection of presentation objects which can be used by the present system. Further any new presentation object can also be added to the visual template library 617. Visual template extension framework 618 is an extension framework used to add more presentation objects to the content presentation module 601. Visual Template library 617 is the library of all presentation types supported by the content presentation module 601. Concept presentation module 601 populates the data from the analyzed and categorized content and populates the visual templates from the visual template library 617.

According to one embodiment of the present invention, the concept presentation module 601 determines that if the user has specified any preferred presentation type in the preferences manger 408. On finding the user's preferences about the presentation type and format with preferences manager 408, the content presentation module 601 further determines that if the personalized content can be appropriately represented in user's preferred presentation type and format for further rendering. The personalized content is subsequently filled into the appropriate visual template to create a final presentation of personalized content to the user. In event of unavailability of the user's preferences about the presentation type and format at the preferences manager 408, the most appropriate presentation type suitable for the content is chosen by the content presentation module 601 for further rendering.

Figure 7:
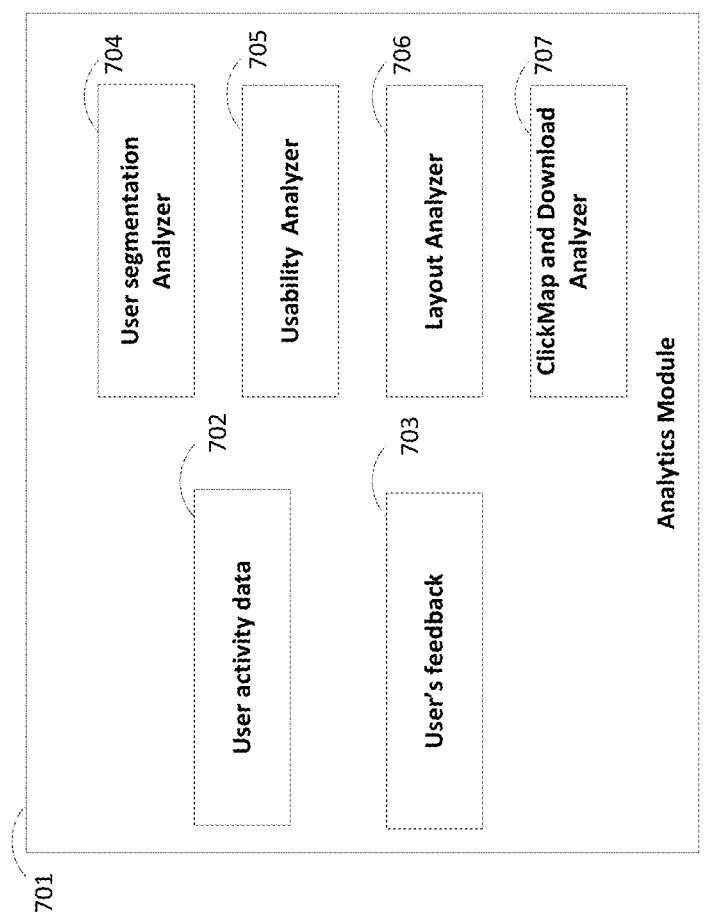
FIG. 7 illustrates an analytics module of the system for delivering the personalized content to a user, according to an embodiment of the invention.

Analytics module 701 as illustrated in FIG. 7 is provided to monitor the user's activities and generate the user activity data 702 and to collect the user's feedback 703 during the presentation of personalized content according to the present invention. User activities can be tracked both implicitly and explicitly. Analytics module 701 closely monitors user's behavior and actively tracks the user's activities during the personalized content presentation to generate the user activity data 702 thereby to understand user's behavior and preferences about the personalized content presented to the user. The user's activities monitored comprise at least one among the click events, download events, usability analysis, reading time and scroll data. In addition to user activity data, analytics module 701 collects user's feedback 703 during content presentation by providing the user a set of queries, options to choose from on the content type an presentation type and format, and other feedback mechanisms. Analytics module 701 also possesses a user segmentation analyzer 704 for identifying the relationship among user profile attributes such as user's role, geography, language or any similar attribute and the actions such as usage of media type, preferred presentation type and format, online advertisement conversion rate or any other similar action. The relationship information is further consolidated to establish the apparent relationship between user attributes and the actions. The relationship established can be used by the content personalization module in customizing the user experience.

Usability analyzer 705 tracks the effectiveness of presentation type and format by analyzing the metrics such as exit rate, video abandonment rate, user time spent on the web page. Layout analyzer 706 analyzes the effectiveness and usability of the presentation layout by measuring the events such as click events at core idea or theme presentation section on the page, click events on the right hand side section of the web page to determine the rate of change of contents such as conversion rate for advertisements, relevancy of aggregated related links, click events in the analogy section to determine the relevancy and effectiveness of analogies. Clickmap and download analyzer 707 measures the click events and download events to identify user's liking for a download type. Analysis of usability analyzer 705, layout analyzer 706 and map and download analyzer 707 is used in improving the presentation type and format presented to the user. Also the analysis helps in measuring effectiveness and usability of analogies presented to the user and related information.

Figure 8:
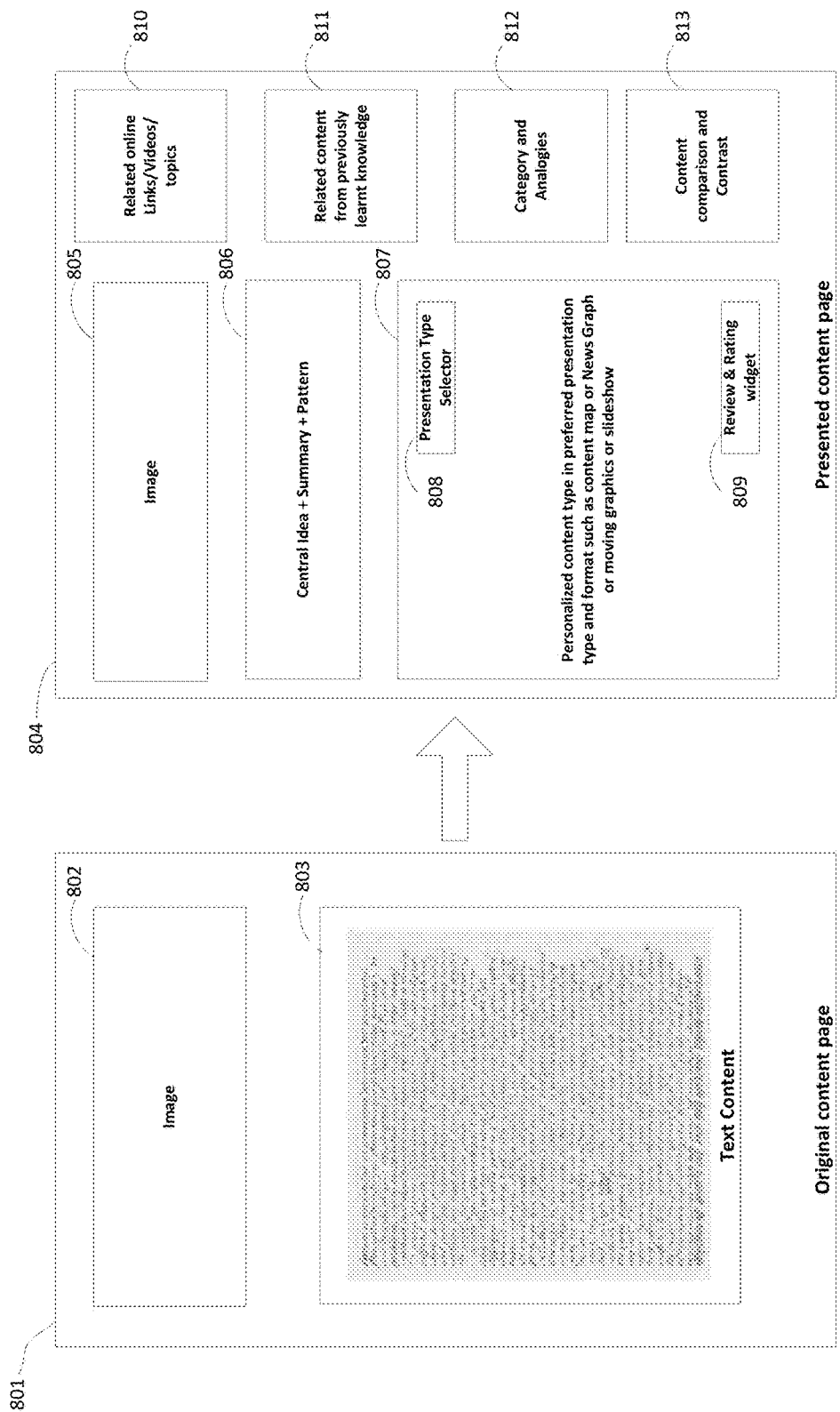
FIG. 8 shows an example view of the personalized content presented to a user, according to an embodiment of the invention.

An example web page presentation of personalized content according to the present invention is now described with reference to FIG. 8. An original content page, 801 is represented in a static web page layout which is predominantly text based and may consist of one or more images. A presented content page, 804 is represented in accordance with the present invention which is presented with a personalized presentation type and format 807 in accordance with the user preferences, where they exist with system or a presentation type and format which suit the subject matter in the personalized content. The presented content page, 804 further comprises an image 805 representing the content being presented, a user's preferred hotspot location 806 where the central idea, summary and patterns noticed are combined and presented to the user for to drawing user's attention and for quick understanding of the details of personalized content.

Further, user is enabled to change the presentation type using the presentation type selector 808 to get the varied views of the same content and can also rate the content using review and rating widget 809. The rating is further used by the system to further improve the personalization of content; this is done by updating the personalized content mapping information. The related content 810 such as links to content sources, articles, graphics, videos and other assets, relevant to the subject matter of the personalized content, aggregated by the relevant content renderer 613 from online sources are presented to the user on the right hand corner of the presented content page 804. Related content 810 is sourced from online using in-built search engine. This would help user to explore the topic further.

The system also determines with the knowledge repository the content with any other topics related to the same category of personalized content to render at 811 in right hand side section of the page. It helps user to build upon the existing knowledge and relate the current subject matter by relating its core concepts to the knowledge user already possess. Analogy renderer presents category and analogies of the content 812 which still enhance user's understandability. Analogies are drawn from user's acquired knowledge or more-easy-to-understand real-world samples. User can make sense of the topic by "similarity" effect. The system also presents the content comparison and contrast 813 where user can compare the core concept with any available concept in the knowledge repository. Content comparison and contrast 813 is an optional content which displays if system finds any similar topic for comparison in the knowledge repository. This again helps in re-enforcing the subject matter being presented to the user. The overall objective of the presented content page 804 is to highlight the key points, summary, category of the content, present the concept in intuitive presentation type and simplify the complex content.

The foregoing description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A computer-implemented method for presenting content personalized for a user comprising:
 analyzing and categorizing the content by a server computer using artificial intelligence and storing the categorized content on a memory of the server computer;

capturing explicit preferences of a user comprising user content interests, preferred content type, preferred presentation type, preferred language, and preferred presentation format;

storing the captured explicit preferences of the user on the memory of the server computer in an internal representation of the user's preferences;

storing an internal representation of prior knowledge of the user;

determining and storing a plurality of implicit preferences of the user;

mapping the categorized content to the internal representation of the user's preferences and the internal representation of prior knowledge of the user to discover the content, relevant to user, by the server computer, from the categorized content; and processing the relevant content into the preferred presentation type and format at the server computer and presenting to the user on a user device; wherein at least one conflict between a conflicting explicit preference and a conflicting implicit preference is resolved by giving precedence to the conflicting explicit preference.

2. The method according to claim 1, wherein analyzing and categorizing the content is carried out by Natural Language Processing (NLP) techniques at the server computer.

3. The method according to claim 2, wherein Natural Language Processing (NLP) techniques include at least one from the group consisting of:
semantic analysis, spatial analysis, chronological analysis, conceptual analysis, quantitative analysis, and pattern analysis.

4. The method according to claim 1, further comprising: capturing at least one among the user's education, working field, profile input by the user, user's history, or past contents presented to the user.

5. The method according to claim 1, wherein mapping the categorized content to user's interests comprises comparing the content concepts with the user content interests.

6. The method according to claim 1, wherein mapping the categorized content to the internal representation of prior knowledge of the user comprises determining similarities and differences with the internal representation of prior knowledge of the user.

7. The method according to claim 1, wherein the presentation type comprises at least one among the Text data, Graphical representation, Images, Concept map, Flow charts, Text to speech, Bulleted list, display of trends, or patterns in the content.

8. The method according to claim 1, further comprising: translating the relevant content into at least one user preferred language for presenting to the user on the user device.

9. The method according to claim 1, further comprising: presenting analogies and compare and contrast information on the user device based on the internal representation of prior knowledge of the user.

10. The method according to claim 1, further comprising: monitoring user's activity by an analytics module during presentation of content, collecting the monitored user's activity data and user's feedback through user device on effectiveness of presented content type, presentation type and formats and updating the user content interests on the memory of the server computer based on the activity data and the feedback collected.

11. The method according to claim 10, wherein the monitored user's activity data comprises at least one selected from the group consisting of:
click events, download events, usability analysis, reading time and scroll data.

12. The method according to claim 10, wherein the user's feedback comprises at least one selected from the group consisting of:
user rating, answers for questions on content type, presentation type and formats output through the user device.

13. The method according to claim 10, further comprising:
presenting on the user device a most relevant content with a most preferred presentation type and formats based on the updated user content interests on the memory of the server computer.

14. The method according to claim 1, further comprising:
collecting the content related to a core concept of content, presented to the user, from plurality of web sources;
presenting the content related to the core concept of content, presented to the user, during content presentation on the user device.

15. The method according to claim 14, where in the content related to the core concept of content, presented to the user, comprises links to further readable contents, audio visual contents, social networking platforms and other content to attract the user's attention.

16. The method according to claim 1, further comprising:
rendering the content, suitable to present on the user device, by a content presentation module.

17. The method according to claim 16, wherein the user device includes a personal computer (PC), a tablet PC, a set-top box (STB), a personal digital assistant (PDA), a mobile device, a hand held device, a wearable device, a global positioning satellite (GPS) device, a palmtop computer, a laptop computer, a desktop computer, a personal trusted device, a web appliance, and any other communication device.

18. A system for presenting content personalized for a user comprising:
a processor;
memory coupled to the processor;
a learning module of a server computer for analyzing and categorizing the content using artificial intelligence and storing the categorized content on a memory of a server computer;
a training module of the server computer for
capturing explicit preferences of a user comprising user content interests, preferred content type, preferred presentation type, preferred language and preferred presentation format;
storing the captured explicit preferences of the user on the memory of the server computer in an internal representation of the user's preferences;
storing an internal representation of prior knowledge of the user; and
determining a plurality of implicit preferences of the user, wherein the implicit preferences comprise geography, language, or media type;
a content processing module of the server computer for
mapping the categorized content to the internal representation of the user's preferences and the internal representation of prior knowledge of the user to discover the content relevant to the user, from the categorized content, and to discover the preferred presentation type and formats; and processing the content relevant to the user into the preferred presentation type and format for presenting to the user on a user device; wherein at least one conflict between a conflicting explicit preference and a conflicting implicit preference is resolved by giving precedence to the conflicting explicit preference; and a content presentation module of the server computer for rendering the relevant content in the preferred presentation type and format on the user device.

19. The system according to claim 18, wherein the learning module includes Natural Language Processing Engine.

20. The system according to claim 19 wherein the Natural Language Processing Engine includes at least one from a semantic analyzer, a spatial analyzer, a chronological analyzer, conceptual analyzer, quantitative analyzer, pattern analyzer, theme analyzer.

21. The system according to claim 18, further comprising:
capturing at least one among the user's education, working field, profile input by the user, user's history, past contents presented to the user.

22. The system according to claim 18, wherein mapping the categorized content to user's interests comprises comparing content concepts with the user content's interests.

23. The system according to claim 18, wherein mapping the categorized content to the internal representation of prior knowledge of the user comprises determining similarities and differences with the internal representation of prior knowledge of the user.

24. The system according to claim 18, wherein the preferred presentation type comprises at least one selected from the group consisting of:
Text data, Graphical representation, Images, Concept map, Flow charts, Text to speech, Bulleted list, display of trends, and patterns in the content.

25. The system according to claim 18, further comprising:
language translators for translating the relevant content into at least one user preferred language for presenting to the user.

26. The system according to claim 18, further comprising:
presenting analogies and compare and contrast information on the user device based on the internal representation of prior knowledge of the user.

27. The system according to claim 18, further comprising:
an analytics module for monitoring user's activity during presentation of content, collecting monitored user's activity data and user's feedback through the user device on the effectiveness of a presented content type, presentation type and format and updating the user content interests on the memory of the server computer based on the activity data and the feedback collected.

28. The system according to claim 27, wherein the monitored user's activity data comprises at least one selected from the group consisting of:
click events, download events, usability analysis, reading time and scroll data.

29. The system according to claim 27, wherein the user's feedback comprises at least one selected from the group consisting of:
user rating, answers for questions on content type, presentation type and formats.

30. The system according to claim 27, wherein the content presentation module presents on the user device most relevant content with a most preferred presentation type and formats, based on the updated user content interests.

31. The system according to claim 18, further comprising:
a searching module of the server computer for collecting the content related to core concept of content, presented to the user, from plurality of web sources for further presenting to the user during content presentation on the user device.

32. The system according to claim 31, wherein the content related to the core concept of content, presented to the user, comprises links to further readable contents, audio visual contents, social networking platforms and other content to attract the user's attention.

33. The system according to claim 31, wherein the content presentation module of the server computer further comprises multi-device renderers to present the content on the user device.

34. The system according to claim 33, wherein the user device comprises:
a personal computer (PC), a tablet PC, a set-top box (STB), a personal digital assistant (PDA), a mobile device, a hand held device, a wearable device, a global positioning satellite (GPS) device, a palmtop computer, a laptop computer, a desktop computer, a personal trusted device, a web appliance, or any other communication device.

35. A non-transitory computer readable storage medium, comprising instructions to perform the steps of:
analyzing and categorizing content by a server computer using artificial intelligence and storing the categorized content on a memory of the server computer;
capturing explicit preferences of a user comprising user content interests, preferred content type, preferred presentation type, preferred language and preferred presentation format;
storing the captured explicit preferences of the user on the memory of the server computer in an internal representation of the user's preferences;
storing an internal representation of prior knowledge of the user;
determining a plurality of implicit preferences of the user, wherein the implicit preferences comprise geography, language, or media type;
mapping the categorized content to the internal representation of the user's preferences and the internal representation of the prior knowledge of the user to discover the content relevant to user, by the server computer, from the categorized content, and preferred presentation type and formats;
processing the relevant content into the preferred presentation type and format at the server computer and presenting to the user on a user device; wherein at least one conflict between a conflicting explicit language preference and a conflicting implicit language preference is resolved by giving precedence to the conflicting explicit language preference;
monitoring user's activities during the presentation by an analytics module, wherein monitoring user's activities comprises collecting the monitored user's activity data and the monitored user's feedback through the user device on effectiveness of presented content type, presentation type and formats and updating the internal representation of the user's preferences on the memory of the server computer based on the activity data and the feedback collected; and
presenting on the user device a most relevant content with a most preferred presentation type and formats based on the updated internal representation of the user's preferences.

36. The non-transitory computer readable storage medium according to claim 35, further comprising:

gathering the content related to a core concept of content, presented to the user, from plurality of web sources; and presenting the content related to the core concept of content presented to the user during content presentation on the user device.

* * * * *